June 2, 1936.  J. T. LITTLETON  2,042,610
METHOD AND APPARATUS FOR TEMPERING GLASS
Filed June 17, 1933
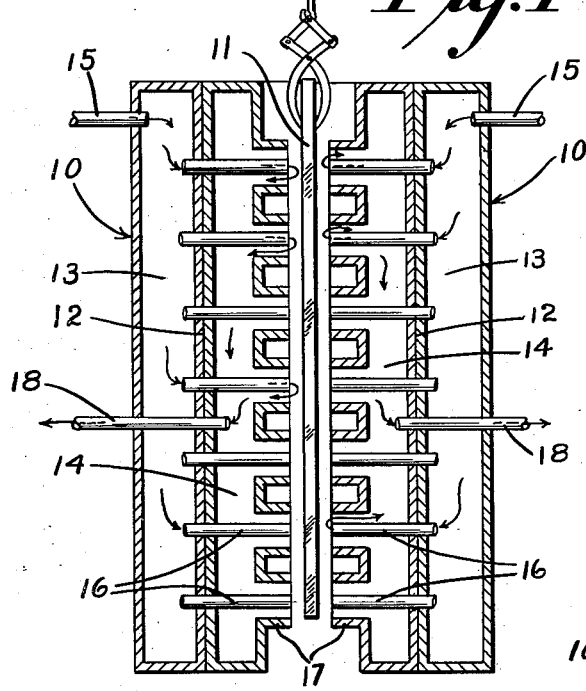
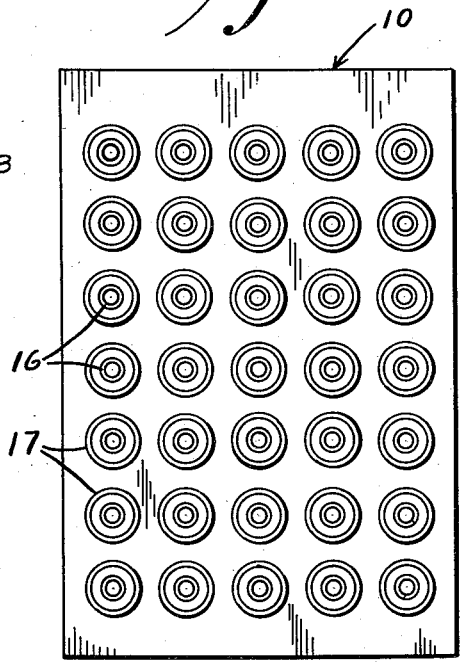
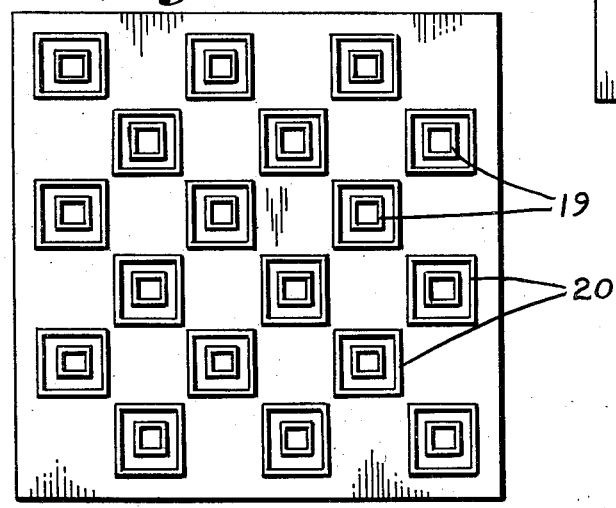
INVENTOR.
JESSE T. LITTLETON
BY *Dousy & Cole*
ATTORNEYS.

Patented June 2, 1936

2,042,610

UNITED STATES PATENT OFFICE 2,042,610

METHOD AND APPARATUS FOR TEMPERING GLASS

Jesse T. Littleton, Corning, N. Y., assignor to Corning Glass Works, Corning, N. Y., a corporation of New York Application June 17, 1933, Serial No. 676,371

4 Claims. (Cl. 49—45)

This invention relates to the tempering of glass by means of air jets directed on the opposite flat faces of the heated glass and has for its object to increase the rapidity with which the sheets may so be cooled and to produce uniform or non-uniform strain patterns as desired without deformation of the soft glass.

In prior methods of tempering glass sheets by means of air jets directed perpendicularly to the plane of the sheet, it has not been feasible to dispose the blast nozzles in close proximity to the surface of the sheet because the back pressure of the air in the restricted space between the nozzles and the sheet tends to reduce the rate of cooling and make it non-uniform and otherwise to decrease the efficiency of the process. Consequently it has been necessary to maintain the blast nozzles at some distance from the surface of the sheet and in order to obtain a sufficient rate of circulation of the air over the surface to effect the rapid cooling desired it has been further necessary to use high velocity jets which tend to deform the soft glass.

I propose to overcome these and other defects in the prior art practices by placing the blast nozzles in relatively close proximity to the surface of the sheet and by rapidly withdrawing the air from the immediate vicinity of the impinging jets.

This may be accomplished by providing eduction nozzles concentric with the blast nozzles. By means of such an arrangement the air after contacting with the glass and becoming heated thereby is immediately withdrawn and replaced by cold air thus producing a maximum rate of cooling. Furthermore, the velocity of the air jets may be substantially reduced thus avoiding the tendency to deform the glass. Since the area of the sheet which is affected by the air issuing from any individual nozzle is only slightly greater in extent than the area of the nozzle itself, the extent of the tempered area can readily be controlled and by a suitable shape and/or arrangement of the nozzles many desired strain patterns can be produced.

For the purposes stated my invention therefor comprises the construction, arrangement and combination of the various parts of which it is composed as will more particularly be described in the following specification, claimed in the appended claims, and illustrated in the accompanying drawing in which:

Fig. 1 is a vertical, sectional view of a device for tempering glass sheets in accordance with my invention;

Fig. 2 is an elevation of one of the tempering elements of Fig. 1 showing the face thereof in accordance with my invention; and Fig. 3 is an elevation of a modified tempering element made in accordance with my invention.

My device as shown in Figs. 1 and 2 comprises preferably a pair of air boxes designated generally 10 and adapted to be brought into relatively close proximity to the opposite flat faces of a heated glass sheet 11. The air boxes are each divided by a partition 12 which separates in each box a compression chamber 13 and a suction chamber 14. Inlets 15 serve to admit compressed air into the chamber 13. Blast nozzles 16 which may be of any desired shape in cross-section, such as round, square, hexagonal, etc., are sealed into the partitions 12 and extend through the chambers 14 to the faces of the boxes, preferably projecting slightly beyond the faces. In the faces of the boxes and around each blast nozzle are eduction nozzles 17 which are annular orifices opening into the suction chambers 14. Exhaust outlets 18 extend from the partitions 12 through the chambers 13 and the rear walls of the boxes. The exhaust outlets 18 are preferably centrally located with respect to the partition 12 in order to equalize the suction to all eduction nozzles.

The glass sheet which has been heated to a temperature near the softening point of the glass (about 550° to 620° C. for window glass) is positioned between the air boxes 10. Cold compressed air supplied to the chambers 13 is expelled from the blast nozzles 16 and after contacting the hot glass is immediately withdrawn by the eduction nozzles 17 and is thus prevented from spreading out over the surface of the sheet to form an insulating blanket of hot air.

Since the spread of the air from individual nozzles is thus relatively closely confined to the vicinity of the nozzles, various strain patterns can be formed by suitably shaping and spacing the nozzles as shown in Fig. 3 which is illustrative of the face of a modified tempering element having blast nozzles 19 and eduction nozzles 20 shaped and spaced to form a pattern.

Although in the foregoing there has been shown and described the preferred embodiment of my invention, it is to be understood that minor changes in the details of construction, combination, and arrangement of parts may be resorted to without departing from the spirit and scope of my invention as claimed.

What I claim is:

1. The method of tempering glass which includes directing jets of air onto the surface of the heated glass and exhausting the air thus directed in the immediate vicinity of the impinging jets.

2. The method of tempering glass which includes directing jets of air under pressure onto the surface of the heated glass and exhausting the air around each individual jet.

3. In an apparatus for tempering glass by an air blast, a pressure nozzle terminating in close proximity to the plane of the glass and directed substantially perpendicularly thereto and a suction nozzle surrounding the pressure nozzle.

4. In an apparatus for tempering glass, a plurality of air blast nozzles terminating in close proximity to the plane of the glass and directed substantially perpendicularly thereto and an eduction nozzle surrounding each blast nozzle.

JESSE T. LITTLETON.